INVENTOR
RICHARD GORDON FISHER

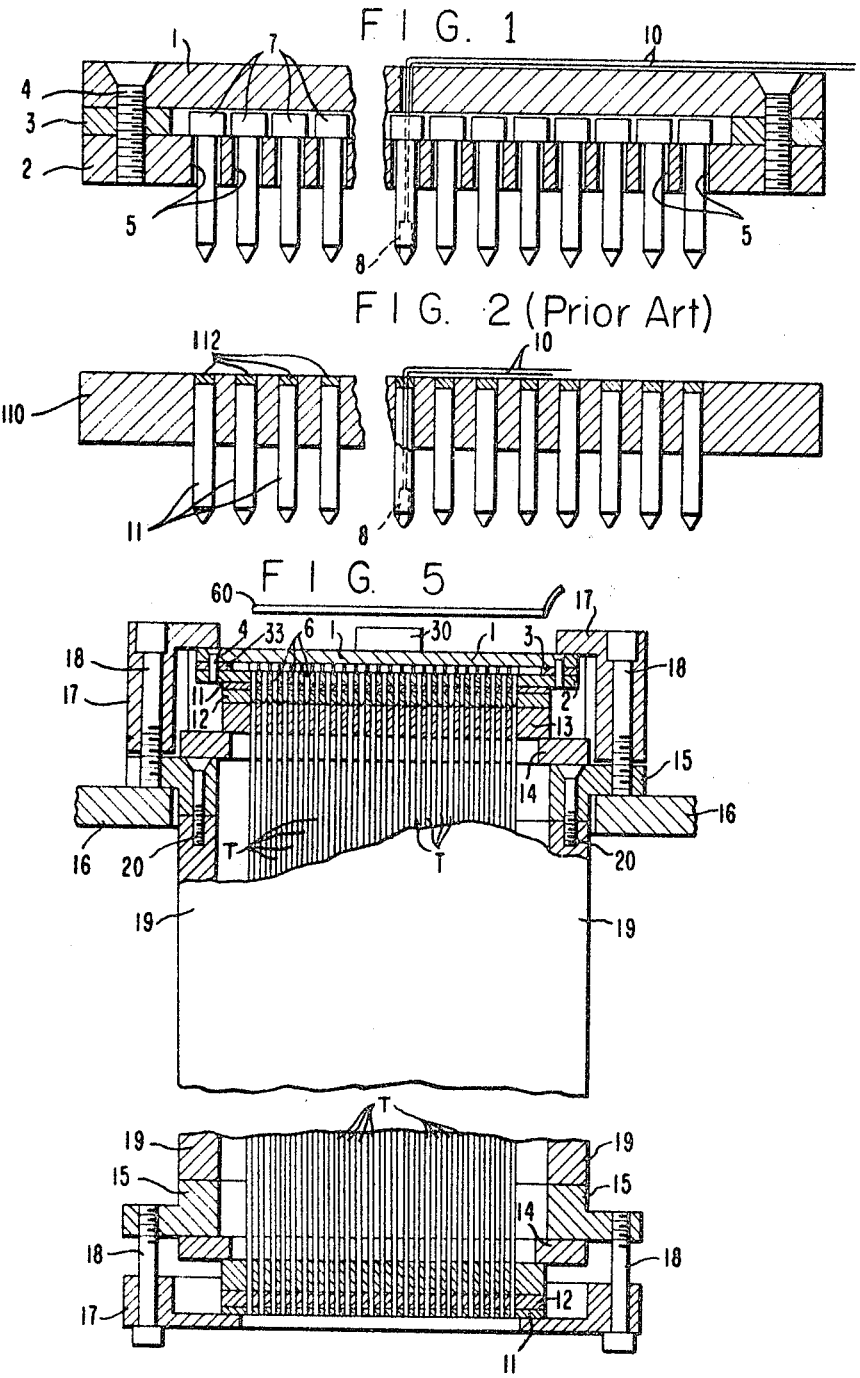

BY *Harry E. Braddock*

ATTORNEY

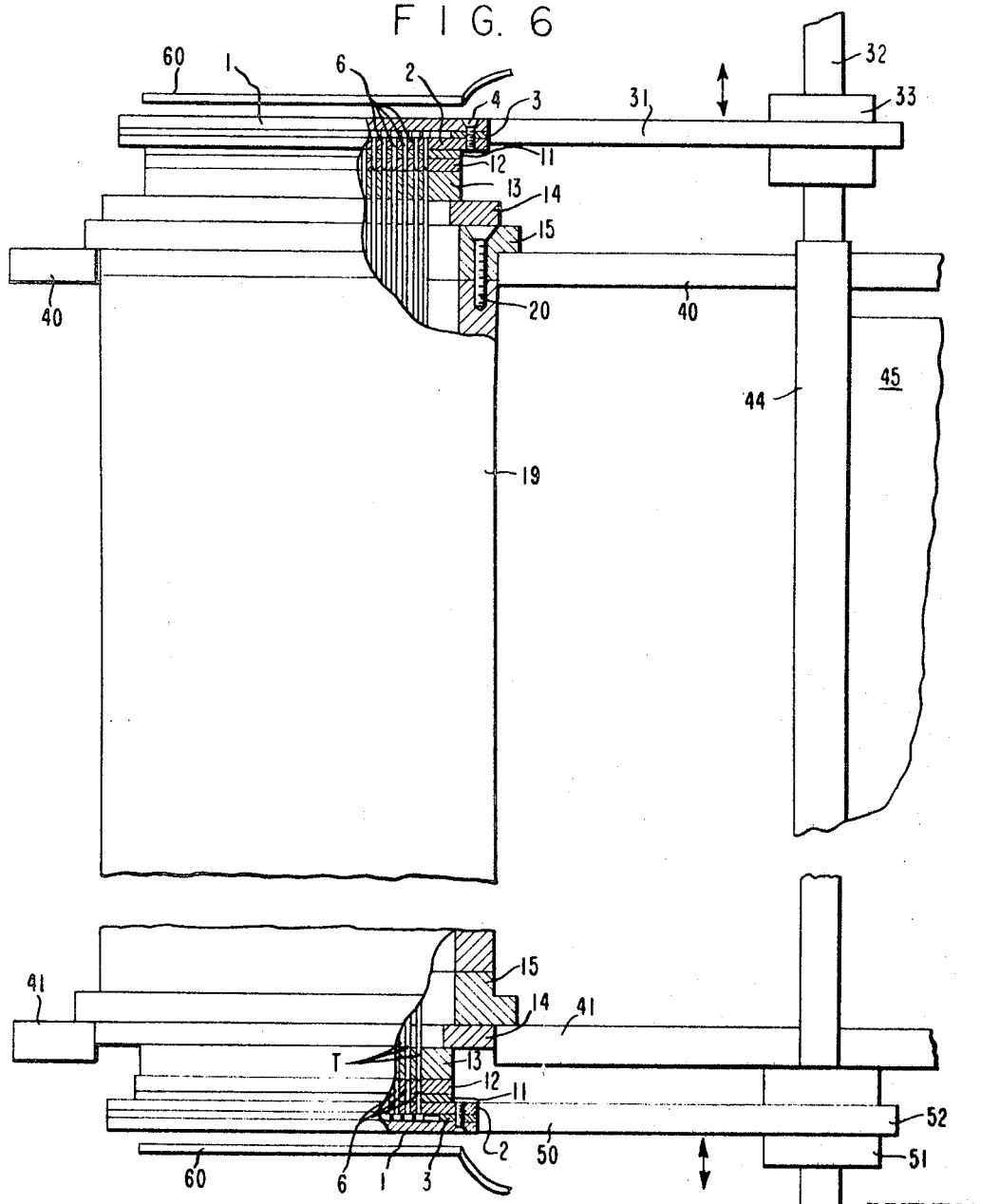

United States Patent Office 3,459,622
Patented Aug. 5, 1969

3,459,622
APPARATUS FOR THE MANUFACTURE OF
PLASTIC TUBE HEAT EXCHANGER UNITS
Richard Gordon Fisher, Dartmouth Woods, Del., assignor to E. I. du Pont de Nemours and Company, Wilmington, Del., a corporation of Delaware
Filed Nov. 7, 1966, Ser. No. 592,608
Int. Cl. B29d 23/00; B32b 31/26
U.S. Cl. 156—423                               5 Claims This invention relates to the field of heat exchange apparatus and its manufacture. More specifically the invention relates to an improved apparatus for uniting a bundle of plastic tube elements with a plastic tube sheet member in operative relationship.

Heat exchange apparatus utilizing plastic tube elements and other plastic parts are known in the art and have proven useful and beneficial in many applications. U.S. Patent No. 3,228,456 represents an example of such apparatus. Manufacturing arrangements for producing this general type heat exchanger apparatus are also known in the art, disclosed for example in U.S. Patent No. 2,433,546.

Because of the use of plastic components such as tube elements and tube sheet members in such apparatus combinations, a number of special problems have been encountered in designing, producing, and using this apparatus. Some of these problems involve the relatively low heat transfer coefficients and the relatively high coefficients of thermal expansion possessed by components made of most plastic materials as compared with components of the heat exchange apparatus, and its production equipment, made of the more conventional materials such as metals. Other problems relate to the different properties such as compressive strength, tensile strength, and melting points of the plastic materials relative to other materials used. For example production techniques must be developed such that the more conventional parts such as those still formed of the usual metallic compositions can be shaped, formed, treated and assembled while in cooperative association with the plastic parts to produce economical, reliable, and effective heat exchange apparatus units without destroying or damaging the associated plastic parts by application of excessive forces, impacts, or temperatures.

It is an object of the invention to provide a novel and improved manufacturing arrangement for manufacturing plastic heat exchanger units comprising plastic tube elements and plastic tube sheet members, which arrangement successfully overcomes the defects and deficiencies of the prior art arrangements, and accommodates the different properties of the plastic components.

It is a further object of the invention to provide such a novel improved apparatus suitable for manufacturing such units on a commercial basis, which apparatus is not only simple and economical to construct, operate, and maintain, but also effective and reliable in operation.

These objects of the invention are achieved in an apparatus which generally comprises in combination; a first means for supporting an assembly, said assembly comprising a bundle of elongated hollow plastic tubular elements having open end portions, and a tube sheet member cooperating therewith and having a plurality of openings therethrough, the open end portions of said tubular elements each extending through one of said openings in said tube sheet member, the external transverse dimension of said open end portions corresponding closely to the internal transverse dimension of said openings, a second means cooperating with said first means and an assembly of tubular elements and cooperating tube sheet member for heat sealing the exteriors of said open end portions of said tubular elements to the interiors of the openings in said tube sheet member in fluid-tight relationship, said second means comprising a unit cooperating with said first means, said unit comprising a plurality of side-by-side substantially parallel pin elements in a substantially planar array, said unit and its pin elements constructed and arranged to cooperate with an assembly of said tubular elements and cooperating tube sheet member supported on said first means such that each pin can be concurrently slidably received in an open end portion of a tubular element as the end portion is positioned in a passageway in the tube sheet member, heating means cooperating with said first means and said movable unit, and in operative association with said pin elements to heat the same and cause sufficient heating of engaged open end portions of the tubular elements and the tube sheet member to fuse the same together to form a fluid-tight seal between the engaged tubular element open end portions and the cooperating tube sheet member said pin elements being freely movably mounted on said unit to permit the spacing of said elements to vary to accommodate thermal expansion of an engaged tube sheet member tending to vary the spacing between its openings without distortion or damage to said pin elements or any engaged tubular element or tube sheet member.

Other objects and advantages will become apparent from a consideration of the following specification and claims taken in conjunction with the accompanying drawings in which:

FIGURE 1 is a partial sectional view through the key component of a manufacturing apparatus embodying principles of this invention.

FIGURE 2 is a similar view to that of FIGURE 1 taken through the corresponding component of a generally similar prior art manufacturing apparatus.

FIGURE 5 is a general partial longitudinal cross sectional view through a manufacturing apparatus embodying features of this invention operatively associated with a bundle of plastic tube elements and two plastic tube sheet members in operative position for bonding the tube element ends at one end of the bundle to their tube sheet member.

FIGURE 6 is a similar view to that of FIGURE 5 showing a modification of the manufacturing apparatus to permit simultaneous bonding operations at each end of the engaged tube bundle-tube sheet members combination for more efficient operation.

Figure 3:
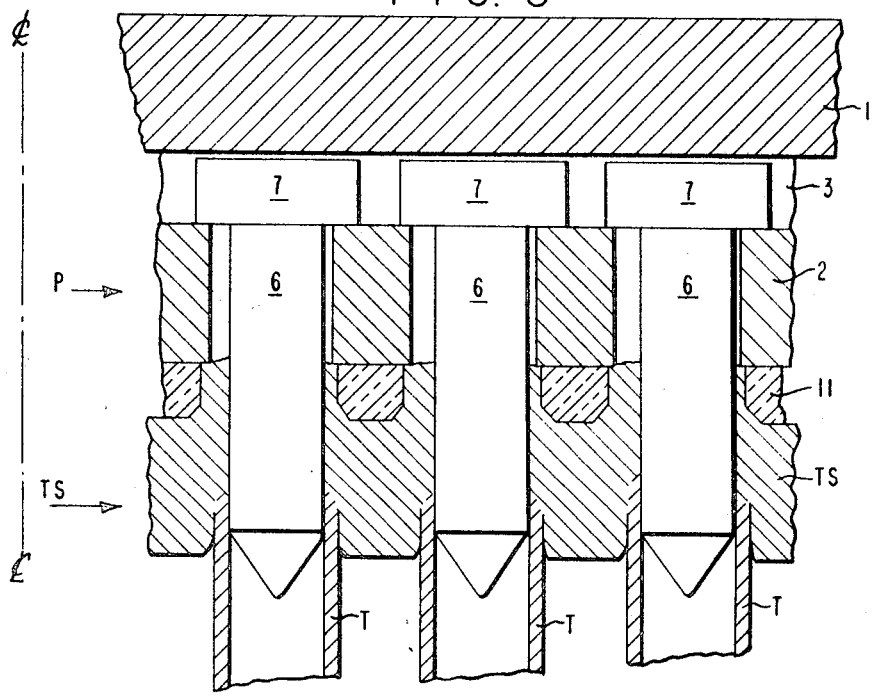
FIGURE 3 is an enlarged view of the component shown in FIGURE 1 shown in combination and in cooperation with assembled plastic tube and tube sheet heat exchanger elements, illustrating how the novel features of the component accommodate the high thermal expansion rate of the tube sheet element relative to the engaged metallic element of the manufacturing apparatus component.

The improved apparatus of the invention as shown in the drawings comprises, as a key component, a heat sealing unit carrying a plurality of pin elements 6 arranged in a side-by-side substantially planar array and substantially parallel to each other as best shown in FIGURE 1. Each pin element is provided with a tapered end and an enlarged or headed end 7. The plurality of pin elements are supported in a composite plate assembly comprising upper plate member 1, annular ring member 3 and, perforated lower plate member 2, the members being secured together in a composite assembly by suitable means such as machine screws 4. As seen in FIGURE 1 the pin elements are positioned in the composite plate assembly with their headed end 7 contained in the open space between the upper and lower plate members 1 and 2 with the tapered ends extending through the openings 5 in plate member 2. It will be seen that the enlarged ends 7 of the pin elements, being larger than the opening 5 positively retain the pin elements within the composite plate assembly. The transverse cross sectional dimensions of the openings 5 are appreciably larger than the corresponding transverse cross sectional dimensions of the pin elements extending through the openings. This permits a considerable degree of lost motion or freedom of movement of the pin elements relative to each other and relative to the composite plate assembly. One of the pin elements, preferably one near the center of the array of pin elements, is provided with a suitable temperature sensing element, such as a thermocouple 8 having usual connection 10, to assist in maintaining desired control over the heating of the pin elements as will be described hereinafter. The key component or heat sealing unit just described is adapted to cooperate with and operate on a heat exchange apparatus assembly to form a permanent fluid-tight joint or connection between the parts thereof. The particular heat exchange assembly operated on by this unit comprises a bundle or plurality of elongated hollow tubular elements T with at least the end portions thereof, in a substantially parallel arrangement, and a tube sheet member TS, 12, having a plurality of substantially parallel passageways of openings therethrough. The objective of the manufacturing operation of the apparatus of this invention is to join, seal, or weld the exterior of the end portion of each tubular element to the interior of one of the openings through the tube sheet member in fluid-tight relationship. Generally to accomplish this, the end portion of each tubular element at one end of the bundle is placed inside one of the openings through the tube sheet member, the outer transverse dimensions of the tubular elements being slightly smaller than the corresponding dimensions of the openings through the tube sheet member. Then the heat sealing unit comprising the composite plate assembly and pin elements is positioned in operative engagement with the heat exchange assembly comprising the assembled tubular elements and tube sheet member, such that each one of the pin elements 6 is received in the end portion of a tubular element which is in turn positioned in one of the openings through the tube sheet member. With the parts thus assembled, the pin elements are heated to a predetermined controlled temperature which is sufficient to cause at least the exterior of the surrounding end portions of the tubular elements to become fused or heat bonded to the interior of the opening through the tube sheet member, after which the assembly and pin elements are permitted to cool down and are removed from the end portions of the tubular elements which are, at this point, securely bonded to the tube sheet member. The same operation must also be carried out at the other end of the group of tubular elements in order to join them to their tube sheet member. The bundle of tubular elements with its attached tube sheet members is then ready for further handling leading to its ultimate incorporation in a complete tube-in-shell type heat exchange apparatus.

Describing this manufacturing arrangement in greater detail, with reference to FIGURES 3 and 5, a bundle of tubular elements T is assembled with tube sheet members 12, TS, at each end thereof and two reinforcing or back-up plate members 13 as shown. The back-up plate members 13, preferably of metallic composition, are in coextensive abutting relationship with the tube sheet members and are provided with openings therethrough corresponding to and in alignment with the openings in the tube sheet members so that the end portions of the tubular elements extend through the aligned openings in both the tube sheet and back-up plate members. These assembled parts are aligned substantially vertically as seen in FIGURE 5 and positioned inside a holding fixture structure which comprises a tubular casing 19. The tubular casing 19 is provided at its upper and lower open ends with an annular element 15 having an outwardly turned flange and secured in position by suitable means such as machine screws 20. The casing 19 is supporting in the vertical position by the engagement of an apertured horizontal support member 16 with the flange on the upper annular element 15 as shown. The assembled parts of the heat exchange assembly to be operated on are supported at the upper end of the holding fixture casing 19 by means of a split ring member 14 positioned between annular element 15 and the back-up plate member 13 of the heat exchange assembly. In the FIGURE 5 arrangement the heat sealing unit, which comprises the pin elements mounted in the composite plate assembly, is clamped in operative engagement with the tubular elements and tube sheet member at the upper end of the heat exchange assembly and its holding fixture by means of clamp elements 17 and bolts 18 which are threadably received in annular element 15. As seen in FIGURE 5, inwardly projecting lug portions of clamp elements 17 engage the upper plate member 1 of the heat sealing unit in order to maintain the unit, the heat exchange assembly, and its holding fixture positively in fixed position relative to each other during the heat sealing operation. It is preferred to use an insulator plate member 11, made of a suitable heat insulating material such as silicone glass, between the lower plate member 2 of the heat sealing unit and the upper surface of the tube sheet members TS, 12, of the heat exchange assembly. The insulator plate member 11 is provided with a plurality of openings corresponding with and accommodating the downwardly extending pin elements 6, the lower ends of which elements engage the upper end portions of the tubular elements which are fitted into the openings in the tube sheet member. Plate member 11 shields the tube sheet member TS, 12, from the direct heat generated by the heat sealing unit. The position of the insulating plate member 11 is shown clearly in FIGURE 3. A suitable heating means, such as an induction heating coil 60 in a "pancake" configuration, is constructed and arranged in cooperation with the heat sealing unit to cause heating of the pin elements 6. Suitable power supply (not shown) are operatively connected to heating means 60 which is controlled to produce a preselected temperature in the pin elements utilizing the thermocouple element 8 and associated control means housed in unit 30. As the pin elements reach the desired temperature the engaged portions of the ends of the tubular elements and the tube sheet member of the heat exchange assembly start to melt and become fused together to form a good fluid-tight seal, at which point the heating action is terminated and the heat sealing unit removed to inoperative position after cooling has occurred.

The lower end of the heat exchange assembly and holding fixture as seen in FIGURE 5 are positioned in an identical arrangement to that at the upper end, it being necessary in the FIGURE 5 construction to invert or reverse the positions of the heat exchange assembly and holding fixture in the horizontal support member 16 to bring the lower end into operative association with the heating element 60.

FIGURE 6 shows an automated version of the arrangement shown in FIGURE 5 in which the heat sealing operation can be performed concurrently at each end (upper and lower) of the apparatus. In this showing the heat exchange assembly, holding fixture and associated parts are carried by moving horizontal support members 40 and 41 attached to a rotatable vertical support 44 into a heat sealing station or position at which the heat sealing units at the top and bottom are moved automatically into and out of operative relationship with the heat exchange assembly by movable elements 31 and 50 caused by vertically reciprocating elements 32 and 51 respectively. Insertion and withdrawal of the pin elements from the end portions of the tubular elements in the tube sheets may be assisted if desired by a vibrating action provided by means not shown. In addition, a lubricant such as silicone oil applied to the pin elements improved the operation of the apparatus.

Figure 4:
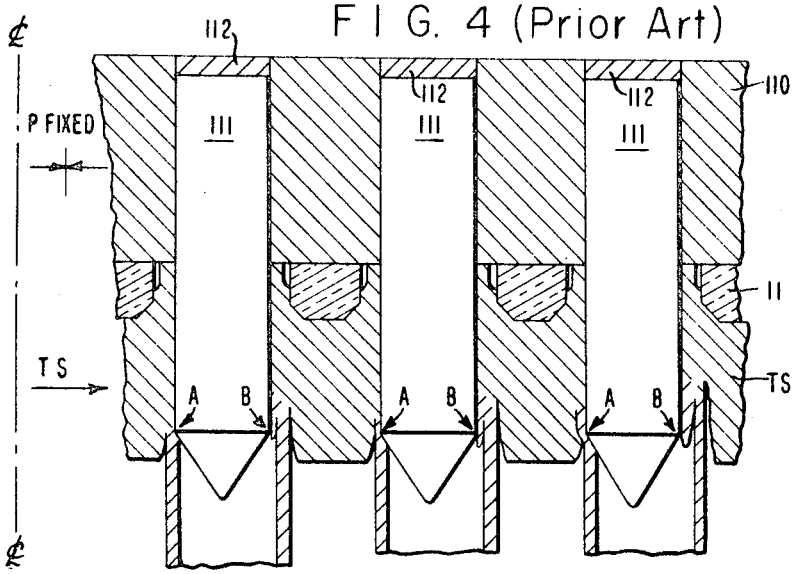
FIGURE 4 is a similar view to that of FIGURE 3 taken through a corresponding component of a generally similar prior art manufacturing apparatus and showing the defective deficient handling thereby of the thermal expansion of the plastic parts.

The most significant and novel feature of the apparatus of the invention involves the construction and arrangement of the composite plate assembly which carries the pin elements of the heat sealing unit. FIGURE 2 illustrates a prior art assembly carrying pin elements of heat sealing units representing the state of the prior art. In these prior art arrangements as shown in FIGURE 2, the pin elements 111 were rigidly secured to a single plate member 110 using soldered, welded, or brazed portions 112. When this prior art arrangement was used to try to heat seal heat exchange assemblies of the sort previously described, the much higher rate of expansion (outwardly from the centerline as shown in FIGURE 4) of the plastic tube sheet member relative to the rate of expansion of the metallic plate member 110 to which the pin elements were rigidly secured caused formation of defective joints between the tubular elements and the cooperating tube sheet member as illustrated in FIGURE 4, specific undesirable dislocations being indicated by the reference characters A and B. These dislocations caused poor seals and leaks.

With the improved heat sealing unit construction of this invention, specifically the arrangement which permits relative movement between the pin elements 6 and the composite plate assembly which supports them; the pin elements during the heat sealing operation, adjust their positions relative to each other and to the composite plate assembly to accommodate the different rates of thermal expansion between the plastic tube sheet member and the composite plate assembly as illustrated in FIGURE 3 of the drawings. This arrangement has made possible highly efficient and reliable heat sealing of this type plastic assemblies using heated metal pins free of the problems caused by the prior art fixed pin heat sealing units.

While the preferred heat exchanger assembly involves polyfluorinated materials, it is believed to be clear that many other thermoplastic materials, such as polymers of amides, acetate, esters, olefins, vinyl halides, styrenes, etc., may be used in practicing the invention, and obviously the choice of material will determine a number of factors, or variables, such as the temperatures and times required to accomplish the desired heat sealing action by use of the apparatus of the invention. Other factors such as dimensions, tolerances, and clearances between the many structural elements will also be affected by the choice of materials as will be recognized by those skilled in the art.

In one satisfactory manufacturing operation, an apparatus similar to that shown in FIGURE 5 was used to heat seal a heat exchange assembly comprising about 330 tubular elements formed of a copolymer of tetrafluoroethylene and hexafluoropropylene and 0.080" diameter x 0.008" wall thickness x 26.0" long, said assembly further comprising two tube sheet members formed of the same materials as the tubular elements and 8" in diameter x ⅛" thick, each tube sheet member being backed up, or reinforced, by a coextensive plate member ⅜" thick formed of stainless steel. Data on the important features of this apparatus arrangement are set forth as follows:

Composite plate assembly—9½" diameter with about 330 circular openings 0.071" in diameter on 0.160 equiangular triangular pitch.
Pin element—diameter of shank 0.059", length of shank 0.328", length overall 0.385" with a conical taper of 75° included angle and a 0.020" radius at top of tapered end. The lower plate member of the composite plate assembly and the pin elements are preferably made of low carbon (CRS) steel for good induction heating.
Insulator plate member—about 8.0" diameter x ¹⁄₁₆" thick made of silicone glass.
Induction heater—7 turn conical shaped pancake induction coil spaced about ½" from top of upper plate member powered by a high frequency generator (input voltage 150 v.) controlled by a Minimite Model No. 80236 voltage regulator manufactured commercially by the Thermo-Electric Company.
Approximate melting point of tubular element and tube sheet member—538° F.
Thermocouple temperature under heat sealing conditions—preferably 550° F.–556° F.
Welding or heat sealing time—4–4½ minutes.

The assembled parts, after the heat sealing operation, were allowed to cool in air until their temperature was less than 100° F., before the heat exchange assembly was removed from the heat sealing apparatus.

I wish it to be understood that I do not desired to be limited to the exact details of construction shown and described, for obvious modifications will occur to a person skilled in the art.

What in claimed is:

1. An improved apparatus for the manufacture of plastic heat exchanger units, said apparatus comprising in combination; a first means for supporting an assembly, said assembly comprising a bundle of elongated hollow plastic tubular elements having open end portions, and a tube sheet member cooperating therewith and having a plurality of openings therethrough, the open end portions of said tubular elements each extending through one of said openings in said tube sheet member, the external transverse dimension of said open end portions corresponding closely to the internal transverse dimension of said openings, a second means cooperating with said first means and an assembly of tubular elements and cooperating tube sheet member for heat sealing the exteriors of said open end portions of said tubular elements to the interiors of the openings in said tube sheet member in fluid-tight relationship, said second means comprising a unit cooperating with said first means said unit comprising a plurality of side-by-side substantially parallel pin elements in a substantially planar array, said unit and its pin elements constructed and arranged to cooperate with an assembly of said tubular elements and cooperating tube sheet member supported on said first means such that each pin can be concurrently slidably received in an open end portion of a tubular element as the end portion is positioned in a passageway in the tube sheet member, heating means cooperating with said first means and said unit, and in operative association with said pin elements to heat the same and cause sufficient heating of engaged open end portions of the tubular elements and the tube sheet member to fuse the same together to form a fluid-tight seal between the engaged tubular element open end portions and the cooperating tube sheet member, said pin elements being freely movably mounted on said unit to permit the spacing of said elements to vary to accommodate thermal expansion of an engaged tube sheet member tending to vary the spacing between its opening without distortion or damage to said pin elements or any engaged tubular element or tube sheet member.

2. The improved apparatus of claim 1 in which said pin elements are formed of a metallic composition and said heating means comprises an induction heating unit cooperating with said pin elements.

3. The improved apparatus of claim 2 in which said unit comprises a control system for sensing the temperature of said pin elements and for regulating the heating action of said pin elements.

4. The improved apparatus of claim 2 in which said apparatus further comprises an actuating mechanism for selectively moving said unit and its pin elements into and out of operative engagement with an assembled tubular element and tube sheet member supported on said first means.

5. The improved apparatus of claim 1 in which said unit comprises a plate element having two major dimensions and a third dimension, said plate element further provided with a plurality of openings therein, each of said pin elements mounted in an opening in said plate element, the structure defining said opening and the structure of said pin elements cooperating to permit substantially free movement of said pin elements in the direction of said two dimensions relative to said plate element, yet preventing movement of said pin element in the direction of the third dimension.

References Cited

UNITED STATES PATENTS

| | | | |
|---|---|---|---|
| 2,433,546 | 12/1947 | Cornelius | 156—196 |
| 3,228,456 | 1/1966 | Brown et al. | 165—1 |

EARL M. BERGERT, Primary Examiner

M. E. McCAMISH, Assistant Examiner

U.S. Cl. X.R.

156—469

PO-1050
(5/69)

UNITED STATES PATENT OFFICE
CERTIFICATE OF CORRECTION

Patent No. 3,459,622  Dated August 5, 1969

Inventor(s) Richard Gordon Fisher

It is certified that error appears in the above-identified patent and that said Letters Patent are hereby corrected as shown below:

Column 6, line 58 (third line from bottom of Claim 1) "opening" should read --openings--.
Column 7, line 10, after "element" insert --relative to each other and said plate element--.

SIGNED AND
SEALED

OCT 21 1969

(SEAL)
Attest:

Edward M. Fletcher, Jr.
Attesting Officer

WILLIAM E. SCHUYLER, JR.
Commissioner of Patents